Patented Jan. 12, 1943

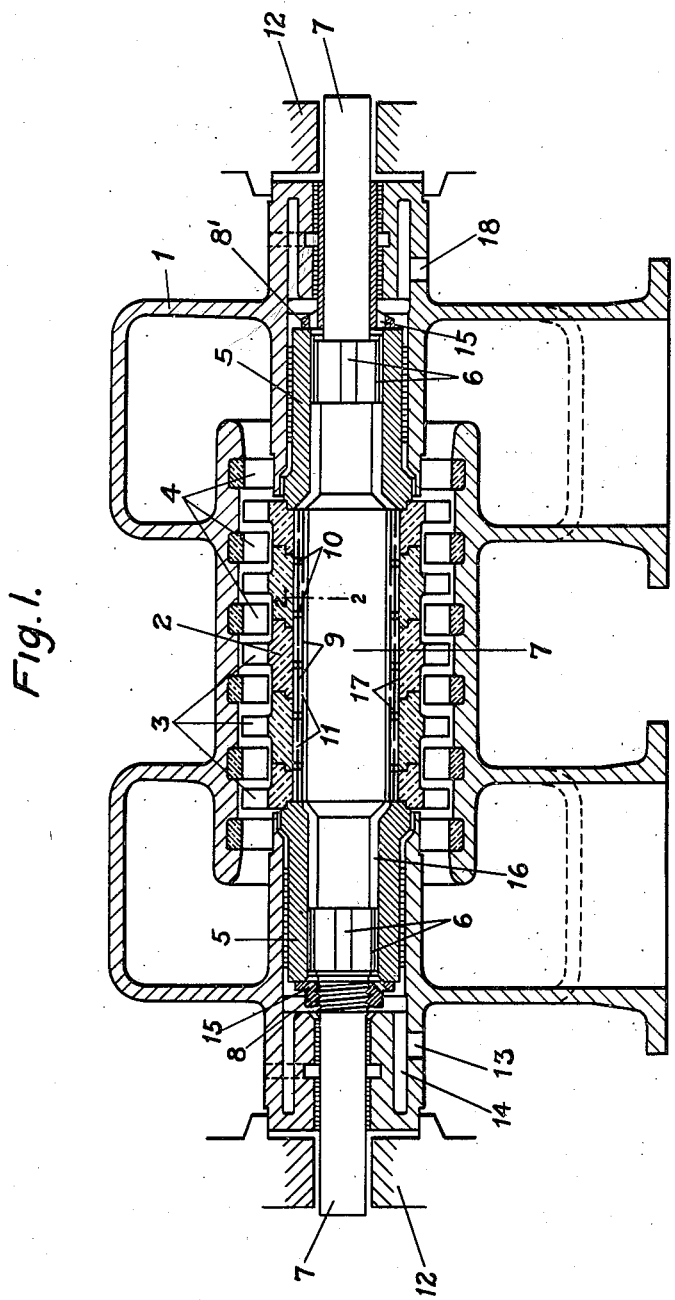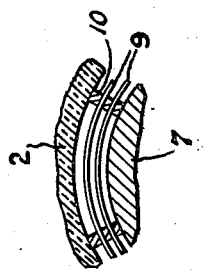

2,308,233

UNITED STATES PATENT OFFICE 2,308,233

ROTOR IN ELASTIC FLUID TURBINE

Alfred Schütte, Augsburg, Germany; vested in the Alien Property Custodian

Application November 27, 1940, Serial No. 367,448
In Germany December 27, 1939

6 Claims. (Cl. 60—41)

This invention relates to a rotor for gas or elastic fluid turbines.

In turbines of this class whose rotors and blades consist of ceramic materials the blades must be of particularly simple construction. When the rotors and blades are made integral to permit operation at highest possible speed, the manufacture of considerably curved constant-pressure blades involves serious difficulties, and it is therefore advisable to use overpressure blades resembling supporting wings. As such blades can handle, however, only relatively small drops in pressure per stage, a large number of steps and thus a long rotor are required.

According to the invention, these troubles are overcome by constructing the rotor in the form of a drum from ceramic masses and imparting to it the necessary rigidity by inserting therein a strong shaft of steel possessing high creep strength. In this way, only the rotor and the blades, all made of ceramic materials, come into contact with the hot fuel gases. This arrangement per se is, however, not sufficient to render a gas turbine operative, since considerable amounts of heat may still be transmitted by conduction and radiation to the steel shaft inside the drum type rotor and cause it to acquire an excessive temperature. To avoid this difficulty provision is made according to the invention for an air gap formed between the rotor and the inner steel shaft and for connecting only the ends of the rotor with the shaft. The steel shaft is thus prevented from being subjected to unduly high temperatures while the entire rotor is still rigid enough to take up great forces.

It is known to cool the casing and the runner of a turbine by an air current passing between the casing and shafts and the casing and runner. The invention is, however, not concerned with cooling the ceramic casing or the ceramic rotor, since these members are capable of withstanding the temperature of the actuating gases even without being cooled, but aims at providing an insulation for the shaft to protect it against heat radiated from the ceramic parts of the turbine.

As ceramic masses are brittle and therefore sensitive to any appreciable change in temperature and, moreover, in case of large temperature drops, thermal stresses are set up in the rotor due to uneven dilatation, it is preferable to employ in the manufacture of gas turbine rotors and blades only such ceramic materials that have a very low thermal coefficient of expansion.

One form of the invention is illustrated by way of example in the accompanying drawing in which Fig. 1 is a longitudinal section of a gas turbine in accordance with the present invention; and Fig. 2 is a fragmentary section on the line 2—2 of Fig. 1, drawn on an enlarged scale.

In a casing 1 a drum type rotor 2 composed of cylinder sections supporting moving blades 3 is arranged, the rotor and the moving blades being made of ceramic material. Between the blade rims guide vanes 4, also consisting of ceramic material, are provided in the casing 1. The rotor 2 is supported on both sides by tubes 5 whose ends are connected with a shaft 7 made of steel possessing great creep strength and inserted in, and surrounded by, the rotor 2 at a distance therefrom, the connection being effected through the medium of wedge-shaped projections 6. The tubes 5 are pressed against the rotor 2 by a nut 8 shown at the left of Fig. 1, to insure a good support, an abutment 8' being provided at the righthand portion of the shaft. The shaft 7 is preferably mounted in the main frame 12 outside the turbine casing 1.

To further prevent radiation of heat from the rotor 2 to the shaft 7 thin heat insulating tubes 9 are concentrically disposed in the space formed between the rotor 2 and the shaft 7 in such manner that they are separated by concentric air gaps and contact only at a few places by means of attached dogs 10. The insulating tubes 9 are therefore not in contact with the steel shaft 7 for the protection of which against heat a strong air current is passed through the gaps formed between the shaft and the tubes 9.

The external insulating tubes 9 nearest the ceramic rotor 2 posses a few small openings 11 to establish only slight communication of the spaces formed between the insulating tubes 9 and the rotor 2 with the annular space through which insulating air flows. This is done to prevent the air current from flowing directly along the inner wall of the rotor 2, since too much cooling of the rotor 2 may produce dangerous thermal stresses. On the other hand, the tubes 9 are to frustrate any heating up of the steel shaft 7. The small bores 11 in the outer tubes 9 have the effect of preventing excessive heating of the air enclosed in the annular spaces formed between the outer tubes 9 and the rotor 2 and the transmission of any larger amount of heat to the shaft 7 by establishing a certain air exchange with the air current.

The insulating air enters the casing 1 at 13 and flows from the annular space 14 through the bores 15 in the nut 8 and the annular space 16 formed between the shaft 7 and the supporting tube 5 into the annular spaces 17 formed by the insulating tubes 9 between the rotor 2 and the shaft 7, and, on the other side, leaves the casing 1 at 18 through corresponding annular spaces and bores.

What is claimed is:

1. In an elastic fluid turbine, a rotor comprising a drum-shaped body member of ceramic material, blades of ceramic material supported by said body member, guide vanes of ceramic material disposed between the rims of said blades, a shaft made of steel possessing great creep strength and inserted in, and surrounded by, said body member at a distance therefrom to impart sufficient rigidty thereto and means for connecting only the ends of said body member with said shaft.

2. In an elastic fluid turbine, a rotor comprising a drum-shaped body member of ceramic material, blades of ceramic material supported by said body member, guide vanes of ceramic material disposed between the rims of said blades, a shaft made of steel possessing great creep strength and inserted in, and surrounded by, said body member at a distance therefrom to impart sufficient rigidity thereto and means for connecting only the ends of said body member with said shaft, the ceramic material used in making said body member, blades and guide vanes having a low thermal coefficient of expansion.

3. In an elastic fluid turbine, a rotor comprising a drum-shaped body member of ceramic material, blades of ceramic material supported by said body member, guide vanes of ceramic material disposed between the rims of said blades a shaft made of steel possessing great creep strength and inserted in, and surrounded by, said body member at a distance therefrom to impart sufficient rigidity thereto and to cause also the formation of a concentric air gap between said body member and shaft for protecting said shaft against heat radiated by said body member, and means for connecting only the ends of said body member with said shaft.

4. In an elastic fluid turbine, a rotor comprising a drum-shaped body member of ceramic material, blades of ceramic material supported by said body member, guide vanes of ceramic material disposed between the rims of said blades, a shaft made of steel possessing great creep strength and inserted in, and surrounded by, said body member at a distance therefrom to impart sufficient rigidity thereto and to cause also the formation of a concentric air gap between said body member and shaft for protecting said shaft against heat radiated by said body member, a plurality of concentric heat insulating tubes inserted in said concentric air gap, means for spacing said tubes relative to one another and the rotor body to form concentric air gaps between the tubes and to reduce contact between the tubes to the points where said spacing means are located, and means for connecting only the ends of said body member with said shaft.

5. In an elastic fluid turbine a rotor according to claim 4, in which a strong air current passes between the body member and the steel shaft and the outer insulating tubes are apertured to provide for an exchange of air with the air current and to prevent excessive heating of the air enclosed in the annular spaces formed between the outer tubes and the body member.

6. In an elastic fluid turbine, a rotor comprising a hollow drum-shaped body member of ceramic material, blades of ceramic material carried by said body member and arranged in a number of axially spaced series, a steel shaft possessing great creep strength and arranged within and surrounded by said body member in spaced relation therewith substantially throughout the length of the body member and imparting rigidity to the rotor, the space between the shaft and the inside of the body member providing an air conducting annular passage concentric with the shaft for protecting the shaft against heat radiated by said body member, and means for connecting only the ends of said body member with said shaft.

ALFRED SCHÜTTE.